UNITED STATES PATENT OFFICE.

MARIE MÉLINA LAMONTAGNE, OF MONTREAL, QUEBEC, CANADA.

COUGH REMEDY.

SPECIFICATION forming part of Letters Patent No. 312,132, dated February 10, 1885.

Application filed August 16, 1884. (No specimens.)

*To all whom it may concern:*

Be it known that I, MARIE MÉLINA LAMONTAGNE, wife of Charles Edouard Brien dit Desrochers, residing in the city of Montreal, in the District of Montreal, in the Province of Quebec, Canada, have invented a new and useful medical composition of matter to be used as a remedy for colds, coughs, bronchitis, whooping-cough, and other similar diseases of the organs of respiration; and I hereby declare that the following is a clear, full, and exact description of the same.

My medical composition of matter is composed of the following ingredients, mixed in the manner and proportions hereinafter stated, viz: honey, eight pounds; water, one gallon; spruce-gum, one pound, dissolved in alcohol or high-wines, 1 gallon; olive-oil, one-half gallon; spirit of peppermint *ad libitum*.

To prepare my medical composition of matter, first boil the eight pounds of honey in one gallon of water until it becomes as thick as a preserving-sirup, then let it cool. At the same time dissolve the spruce-gum (one pound) in the alcohol or high-wines (one gallon) and strain it to separate the impurities; add spirit of peppermint to give sufficient flavor, then mix all these ingredients and add half a gallon of good olive-oil; shake when cold, and the compound is ready for use.

What I claim, and desire to secure by Letters Patent of the United States, is—

The herein-described medical compound or composition of matter, to be used as a remedy for the diseases of the organs of respiration, consisting of honey, water, spruce-gum dissolved in alcohol, olive-oil, and spirit of peppermint, in the above-stated proportions.

Signed at Montreal this 11th day of August, 1884.

MARIE MÉLINA LAMONTAGNE.

In presence of—
J. BROSSOIT,
A. BRUNEAU.